United States Patent
Knopp (10) Patent No.: US 12,488,333 B2
(45) Date of Patent: Dec. 2, 2025

(54) SYSTEM AND METHOD FOR TOKEN BASED PAYMENTS

(71) Applicant: MasterCard International Incorporated, Purchase, NY (US)

(72) Inventor: Joshua Carter Knopp, Defiance, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1079 days.

(21) Appl. No.: 15/181,917

(22) Filed: Jun. 14, 2016

(65) Prior Publication Data

US 2017/0357965 A1 Dec. 14, 2017

(51) Int. Cl.
G06Q 20/36 (2012.01)
G06Q 20/38 (2012.01)
G06Q 20/40 (2012.01)

(52) U.S. Cl.
CPC ......... *G06Q 20/3674* (2013.01); *G06Q 20/36* (2013.01); *G06Q 20/3821* (2013.01); *G06Q 20/385* (2013.01); *G06Q 20/409* (2013.01)

(58) Field of Classification Search
CPC ............... G06Q 20/3674; G06Q 20/36; G06Q 20/3821; G06Q 20/385; G06Q 20/409; G06Q 30/0215
USPC .......................................................... 705/67
See application file for complete search history.

(56) References Cited

U.S. PATENT DOCUMENTS

| | | | |
|---|---|---|---|
| 2013/0332344 A1* | 12/2013 | Weber | |
| 2014/0143151 A1* | 5/2014 | Dhar et al. | |
| 2015/0120472 A1* | 4/2015 | Aabye et al. | |
| 2015/0254698 A1* | 9/2015 | Bondesen et al. | |
| 2015/0312038 A1* | 10/2015 | Palanisamy | |
| 2016/0232527 A1* | 8/2016 | Patterson | |
| 2017/0278174 A1* | 9/2017 | Harrell | |
| 2017/0300897 A1* | 10/2017 | Ferenczi et al. | |
| 2017/0323291 A1* | 11/2017 | Donga | |

(Continued)

OTHER PUBLICATIONS

"PCT Notification of Transmittal of the International Search Report and the Written Opinion", of the International Searching Authority, or the Declaration, dated Aug. 8, 2017 (Aug. 8, 2017), for International Application No. PCT/US2017/036236, 13pgs.

(Continued)

*Primary Examiner* — Neha Patel
*Assistant Examiner* — Yin Y Choi
(74) *Attorney, Agent, or Firm* — Buckley, Maschoff & Talwalkar LLC (57) ABSTRACT

Provided are a system and method for generating and transmitting tokenized payment information. In one example, the method includes transmitting a request for payment information to a payment network, receiving tokenized payment information of a payment account from the payment network, and transmitting the tokenized payment information to a merchant. According to various exemplary embodiments, the tokenized payment information may include a tokenized account number representing an account number of the payment account and a tokenized credential representing an additional credential of the payment account.

18 Claims, 5 Drawing Sheets

(56) References Cited

U.S. PATENT DOCUMENTS

2017/0357976 A1\* 12/2017 Malik et al.
2020/0304486 A1\* 9/2020 De Ganon et al.

OTHER PUBLICATIONS

"EMV Payment Tokenisation Specification Technical Framework", Version 1.0, Mar. 31, 2014 (Mar. 31, 2014), XP055193899, Retrieved from the Internet: URL:https://www.emvco.com/specification.aspx?id=263, [retrieved on Jun. 5, 2015], 84pgs.
Anonymous: "Plug-in (computing)—Wikipedia", May 24, 2016 (May 24, 2016), XP055391060, Retrieved from the Internet: URL:https://en.wikipedia.org/w/index.php?title=Plug-in_(computing)&oldid=721802770, [retrieved on Jul. 14, 2017], 3pgs.

\* cited by examiner

SYSTEM AND METHOD FOR TOKEN BASED PAYMENTS

FIELD

Exemplary embodiments described herein relate generally to electronic transactions and, more particularly, to electronic transactions in which payment is made using tokenized payment data.

BACKGROUND

Payment accounts such as credit cards and debit cards are widely used by consumers in e-commerce transactions. For example, an account holder of a payment account may use a personal computer, a tablet, a smartphone, and the like, to access a merchant's online store (e.g., webpage). After selecting items for purchase from the merchant's site and opting to checkout or otherwise submit payment, the account holder is typically prompted to enter payment account information into a data entry page downloaded from a merchant computer such as a merchant host server. In response, the merchant computer initiates a payment account transaction using the information entered by the account holder.

In a typical payment process, an account holder enters their payment account information into the merchant's data entry page and the merchant computer processes the payment account information. Here, the payment account information may include sensitive account information, for example, a payment account number (PAN), an expiration date, a security code, and the like. Recently, in an effort to protect payment account information, tokens are being used to replace payment account numbers. A token is typically a non-sensitive data element that is substituted for the PAN of the payment account. The token often has no exploitable meaning or value, and is therefore useless if stolen or otherwise obtained or leaked to outside parties.

One type of payment method that uses tokenization is a digital wallet. A digital wallet allows a consumer to register a payment card or cards with a digital wallet provider for future checkouts. When using a digital wallet to make an online purchase, a token provider (e.g., a bank, payment processor, and the like) replaces a primary account number (PAN) included in the digital wallet with a token. Here, the token may be a random number sequence, a format preserving encryption algorithm, and the like. A token can typically be reversed to its true associated PAN by the token provider that initially created the token. One of the benefits of a token is that the actual PAN is not provided to the merchant during the payment process thereby reducing the exposure of sensitive account information of an account holder.

A wallet service provider typically maintains a digital wallet for a consumer. For example, a consumer may enter one or more payment accounts, and other personal information (identification, insurance, etc.) into their digital wallet, and the wallet service provider may store the corresponding information in a data partition that is dedicated to the respective consumer. The container storing the data is referred to as a digital wallet. In order for a consumer to use the digital wallet when checking out on a merchant website, a merchant must be enrolled in a digital wallet payment service providing the digital wallet to the consumer. Typically a merchant indicates which digital wallets they accept by displaying a button, logo, hyperlink, and the like, on a checkout page. In order to use a digital wallet payment service, a merchant usually has to contribute a percentage of each sale or submit a payment on a recurring basis to the digital wallet payment service.

However, if a merchant is not enrolled in a digital wallet service, or is not enrolled in a particular digital wallet service used by a consumer, the consumer is unable to make payment using the digital wallet. For example, if the user were to attempt to enter the tokenized payment information of the digital wallet into the payment field on the merchant account, the tokenized payment information would not match a format that is recognizable and/or acceptable to the merchant. Accordingly, a consumer must enter actual sensitive payment account information into the merchant web site and transmit the sensitive payment account information to the merchant over a public network such as the Internet.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various exemplary embodiments, provided herein is a system that allows a consumer to make payment on a merchant's website using tokenized payment information even in a case where the merchant is not enrolled in or enabled for use with tokenized payment services such as digital wallets. For example, a plugin or other software may be installed within a web browser of a user computing device (i.e., a consumer). The plugin may detect when the user attempts to make payment, or when a user accesses a payment page provided by a merchant website. The plugin may communicate with a wallet service provider and/or a token provider (e.g., token vault) and receive tokenized payment information for use in making payment through the merchant website. The tokenized payment information may include tokens in place of payment account credentials. According to various aspects, in addition to the account number being tokenized, one or more additional payment account credentials such as an expiration date, a card security code, and the like, may be tokenized.

The tokenized payment information may be in a format that is the same as the format of conventional non-tokenized payment account information. For example, the one or more additional tokenized credentials may have a format that is recognizable to a merchant that does not accept tokenized payment account information. Accordingly, the merchant may be unaware that the tokenized payment information is being passed to the merchant. In this example, the tokenized payment information may be passed to the merchant through conventional payment account credential fields (e.g., account number, expiration date, card security code, social security, insurance information, etc.) included within a webpage downloaded from a merchant server. Accordingly, a consumer may use a digital wallet (including tokenized payment data) to make a payment to a merchant that is not enrolled in a wallet service (i.e., a non-wallet enabled merchant website).

In a related art, a payment token may be a value or number that takes the place of a primary account number (PAN) during a portion of a payment transaction process. The exemplary embodiments herein further tokenize additional payment data. The additional payment data that is tokenized may have a format that is recognizable to a merchant that accepts only conventional non-tokenized payment data. Accordingly, payment account credentials such as an account number, expiration date, card security code, banking details, and the like, may be tokenized but still be recognizable by a merchant as being valid (i.e., non-tokenized). As a result, actual payment data is not submitted between the user and the merchant and is not processed by the merchant, thus, increasing the overall security of the user's account information. Furthermore, a merchant may accept payment from a digital wallet even though the merchant is not enrolled in a digital wallet service, thus expanding the use of digital wallets. Also, a merchant does not need to pay for a digital wallet service in order to accept digital wallet payments.

As described herein, 'valid' refers to a number, code, and/or the like that appears valid to a merchant. For example, a tokenized expiration date may include a numerical token having a format of a month and a year (i.e., a date) that is later than a present date so as to appear as though the expiration date has not expired. That is, if the token were read as an expiration date value in the format "MMYY," the indicated calendar month date and year date would not be in the past relative to a current date at which the transaction is taking place. Similarly, if the card security code were a CVC2 value, a tokenized card security code may have a three digit numerical value and may appear as if an actual and valid CVC2 value. Accordingly, the exemplary embodiments describe a payment process in which a token service provider generates tokens in place of payment account credentials, for example, credentials for an account number, an expiration date, a card security code, and the like. The tokens each have formats that are valid and are capable of being passed through to a merchant through a web-Tillable checkout page, or the like. Accordingly, a user may enter tokenized payment information into a conventional merchant website without the merchant subscribing to a tokenization service such as a digital wallet.

Figure 1:
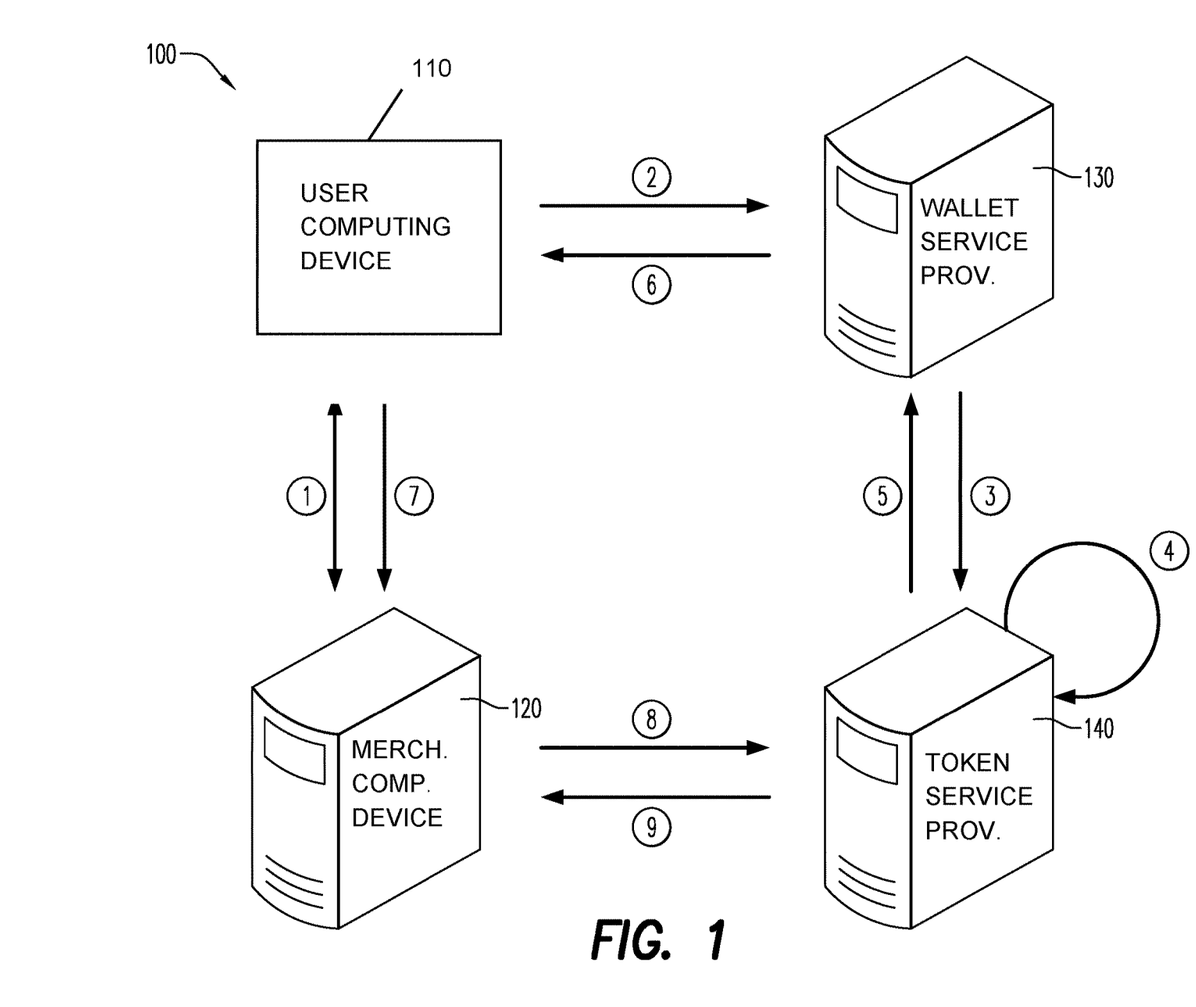
FIG. 1 is a diagram illustrating an overview of a payment system in accordance with an exemplary embodiment.

FIG. 1 is a diagram illustrating an overview of a payment system 100 in accordance with an exemplary embodiment. Payment system 100 includes a user computing device 110, a merchant computing device 120, a wallet service providing device 130, and a token service providing device 140. Although not illustrated in FIG. 1, the payment system 100 may include additional devices, for example, an acquiring bank computing device, an issuing bank computing device, a payment card network, a payment gateway, and the like, as can be appreciated by one skilled in the art. Furthermore, in some examples one or more of the devices shown in FIG. 1 may be combined or may be omitted. For example, the wallet service providing device 130 may be combined with the token service providing device 140 in an example in which the wallet service and the token service are provided by the same entity. Also, in some examples the user computing device 110 may communicate directly with the token service providing device 140.

According to various aspects, the user computing device 110 may download and install software, for example, a plugin, an application programming interface (API), and/or the like, within a web browser that is stored and executed by the user computing device 110. The software (also referred to herein as plugin) may provide a user of the user computing device 110 with a method of making payment on a merchant website using a digital wallet even though the merchant is not enrolled in a digital wallet service. The software may be installed by a user of the user computing device 110 before accessing a merchant website, in response to accessing the merchant website, during a payment process, and the like. For example, a pop-up window may be displayed on the user computing device 110 requesting permission to install the software. As described in the example of FIG. 1, the user computing device 110 may operate based on the installed software.

Referring to FIG. 1, in step 1, the user computing device 110 requests and receives payment details from the merchant computing device 120. For example, a user of the user computing device 110 may access a merchant website (e.g., an e-commerce website) hosted by the merchant computing device 120. The user may access the merchant site through a web browser executed on the user computing device 110. By accessing the merchant website, the user may activate or trigger the web browser plugin. For example, in response to detecting a checkout page or other form of payment information entry page, the web browser plugin may automatically initiate a query to the merchant computing device 120 requesting payment information or payment account details that the merchant needs or otherwise requests for processing a payment. In response, the merchant computing device 120 may provide the user computing device 110 with account information which the merchant needs to process a payment. The account information may include account credentials such as an account number (PAN), an expiration date, a card security code, a social security number (or partial social security number), a driver's license, an address, and the like.

The user computing device 110 transmits a payment information request to the wallet service providing device 130, in step 2. In this example, the wallet service providing device 130 may store payment account information of the user of the user computing device. For example, the wallet service providing device 130 may store a digital wallet, including one or more payment card accounts, identifications, and the like, of the user. Here, the wallet service providing device 130 may be a server operated by or controlled by an online wallet provider such as MasterCard MasterPass, Google Wallet, Apple Pay, Visa Checkout, PayPal, Samsung Pay, and the like. The payment information request may include account information requested by the merchant computing device 120 in order to process a payment for the user.

The wallet service providing device 130 transmits a token request to the token service providing device 140, in step 3. While the wallet service providing device 130 and the token service providing device 140 are shown as separate entities in this example, it should also be appreciated that the two entities may be the same, or the same entity may control the devices. For example, the token service providing device 140 may be a server operated by or controlled by a token vault. Also, the token service providing device 140 may be maintained by a bank, a payment processor, a non-merchant payment entity, and the like. Furthermore, the wallet service providing device and/or the token service providing device may be broadly referred to as a payment network or included within a payment network. In this example, the payment network may also include other financial entities, banks, payment processors, and the like, which are used with a payment process.

The token service providing device 140 may generate tokens in place of payment account information and store payment mapping information that maps the actual payment account details to the tokenized information, in step 4. For example, the token service providing device 140 may generate a respective token for each of a plurality of payment account credentials and map each token to each respective credential. Each token may have a format that corresponds to a valid payment account field format and as a result may be entered into an existing field of a merchant's website. For example, if a token represents the last four digits of a social security number, the token may be 4 numbers that are recognizable by the merchant as a valid partial social security number, but may not be the actual last four digits of the cardholder. That is, the tokens described herein may include arbitrary, random, and/or unusable values which may only be converted to their true value by the token service providing device 140.

According to various exemplary embodiments, the token service providing device 140 may generate a token for a primary account number (PAN) of a cardholder's account. Furthermore, the token service providing device 140 may generate one or more additional tokens for one or more additional payment account credentials, for example, an expiration date, a card security code, a social security number (or partial social security number), a birth date, a driver's license number, an address, and the like, corresponding to an account holder of the payment account. As an example, the token service providing device 140 may generate a plurality of tokens including a first token representing a PAN, a second token representing an expiration date, and a third token representing a card security code. In this example, each of the first, second, and third tokens may have a format that is recognizable by a merchant as being valid entries when entered into a checkout page on the merchant's website. That is, each of the tokens may have a format that is capable of being passed to the merchant through a corresponding entry field on the merchant's website. For example, each of the tokens may have a format that is compatible with fields of International Standards Organization (ISO) 8583 messages, such as payment authorization request and response messages. Accordingly, the tokenized payment information including the tokenized account number and the at least one other additional tokenized credential (e.g., expiration date, card security code, etc.) may be included within an existing ISO 8583 message.

Also, the token service providing device 140 may store mapping information including a map or list between tokens and their corresponding actual payment account credentials. For example, tokenized payment information of a payment account may include a first token representing a card security code and a second token representing an expiration date. The token service providing device 140 may store mapping information including an identifier between the first token and the actual card security code of the payment account and mapping information including an identifier between the second token and the actual expiration date of the payment account.

The token service providing device 140 may store the plurality of tokens as tokenized payment information, and, in step 5, the token service providing device 140 may transmit the tokenized payment information to the wallet service providing device 130. In response to receiving the tokenized payment information, the wallet service providing device 130 may transmit the tokenized payment information to the user computing device 110 in step 6. For example, the wallet service providing device 130 may transmit the tokenized payment information to the plugin installed on the user computing device 110, and the plugin may automatically populate fields of the merchant web page on a screen of the user computing device 110 with the tokens included in the tokenized payment information. As a non-limiting example, the received tokenized payment information may include a tokenized account number representing an account number of a payment account of the user and a tokenized credential representing an additional credential of the payment account of the user.

The plugin may automatically populate an account number field and at least one other credential field, for example, an expiration date field, a card security code field, and the like, with respective tokens received from the wallet service providing device 130. In some cases, the user of the user computing device 110 may manually fill in one or more fields on the merchant web page that are not automatically filled in with tokens by the plugin.

The user may validate payment credentials and other shopping cart data displayed within the merchant website on the user computing device 110, and in step 7 the user computing device 110 may transmit the tokenized payment information to the merchant computing device 120. For example, the tokenized payment information may be transmitted by the user when the user submits the payment information previously populated on the merchant site. The tokenized payment information may include a tokenized account number representing an account number of the payment account and at least one other tokenized credential representing at least one other additional credential of the payment account. Even though the at least one other credential is tokenized, it may be in a format that is recognizable by the merchant as being a valid credential. Accordingly, even though the merchant corresponding to the merchant computing device 120 may not be enrolled in a digital wallet service provided by the wallet service providing device 130, the merchant computing device 120 may receive payment from a digital wallet account (including tokenized payment information) provided by the wallet service providing device 130. That is, the merchant corresponding to the merchant computing device 120 does not need to enroll in a digital wallet service provided by the wallet service providing device 130 to receive payment from a digital wallet controlled by the wallet service providing device 130. Furthermore, the merchant website receiving the tokenized payment information from the user computing device 110 does not need to be enabled to receive conventional tokenized payment information. As a result, the merchant may receive tokenized payment account credentials as if they are valid payment account credentials and pass the tokenized payment information to an acquiring bank, payment card network, and the like, and never know that the payment account credentials are tokens.

In step 8, the merchant computing device 120 transmits the tokenized payment information to the token service providing device 140 for verification of the tokenized payment information. Further, in step 9 the token service providing device 140 determines whether the tokenized payment information is mapped to the user of the user computing device 110, and transmits a result of the determination in the form of a successful or unsuccessful authorization of payment to the merchant computing device 120. For example, the token service providing device 140 may receive a payment request from the merchant computing device 120, including tokenized payment information. The token service providing device 140 may detokenize the tokenized payment information based on previously stored mapping information, and verify whether the detokenized payment information corresponds to the payment account of the user. In response, the token service providing device 140 may transmit a payment authorization response based on the verification.

Although FIG. 1 shows the merchant computing device 120 transmitting tokenized payment information directly to the token service providing device 140, the examples herein are not limited thereto. As another example, the tokenized payment information may be transmitted to a merchant's acquiring bank, and the merchant's acquiring bank may transmit the tokenized payment information to the token service providing device 140. Also, in response to receiving the tokenized payment information, the token providing service device 140 may transmit the payment information to an issuing bank for authorization. As yet another example, the token providing service device 140 may be controlled or operated by an issuing bank.

Figure 2:
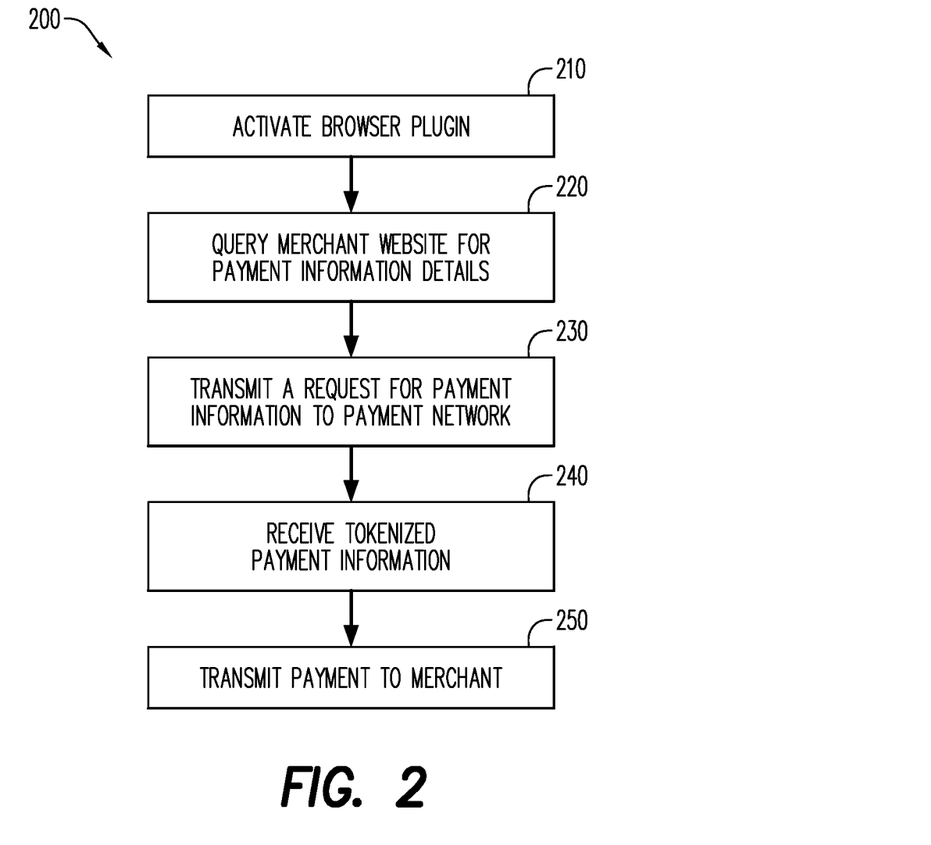
FIG. 2 is a diagram illustrating a method of transmitting tokenized payment information in accordance with an exemplary embodiment.

FIG. 2 is a diagram illustrating a method 200 of transmitting tokenized payment information in accordance with an exemplary embodiment. The tokenized payment information may be transmitted from a user computing device to a merchant computing device in an attempt to settle a transaction between a user of the user computing device and a merchant corresponding to the merchant computing device.

Referring to FIG. 2, in 210, a browser plugin installed on the user computing device 110 may be activated. For example, the browser plugin may be activated by a user of the user computing device visiting a payment submission or payment entry page of a merchant website. Here, the plugin may detect one or more fields included in a web page downloaded from a merchant computing device that hosts the merchant website. For example, the plugin may detect a payment card account number field, an expiration date field, a security code field, an address field, a date of birth field, and the like, included in a checkout page. As another example, the browser plugin may be activated by a user clicking on a button or link on the webpage of the merchant.

The plugin may query the merchant website for payment details requested by the merchant website to process an online payment, in 220. For example, the plugin may detect various payment entry fields within a webpage of the merchant site. The payment fields may include one or more of a payment card number, an expiration date, a card security code number, an address, a social security number, and the like. Based on the detected payment details, in 230, the user computing device 110 transmits a request for payment information to a payment network, such as the network operated by MasterCard International Incorporated, the assignee of the present disclosure. For example, the user computing device 110 may transmit the request to a wallet service provider, a token service provider, and the like. The request may identify payment fields from the merchant website which are needed to process a payment request.

In response, the user computing device 110 may receive tokenized payment information from the payment network, in 240. The tokenized payment information may include a token for a primary account number (PAN) of a user's account. Furthermore, the tokenized payment information may include one or more additional tokens for one or more additional payment account credentials, for example, an expiration date, a card security code, a social security number (or partial social security number), a birth date, a driver's license number, an address, and the like, corresponding to an account of the user. The tokens may include random, arbitrary values, however, the tokens may have a format that matches a valid format of conventional payment account credentials. Accordingly, the tokens may be entered into payment fields of a merchant website without the merchant knowing that the entries are tokens. Instead, the entries may appear as valid entries to the merchant.

In 250, the user computing device transmits tokenized payment information to the merchant computing device. For example, a user of the user computing device may hit a "submit" button on the merchant's website after tokenized payment account information has been entered into payment account fields of the merchant website. Upon successful authorization from a payment card network, the user computing device 110 may receive a notice of successful payment from the merchant computing device, or another computing device within the payment network.

Figure 3:
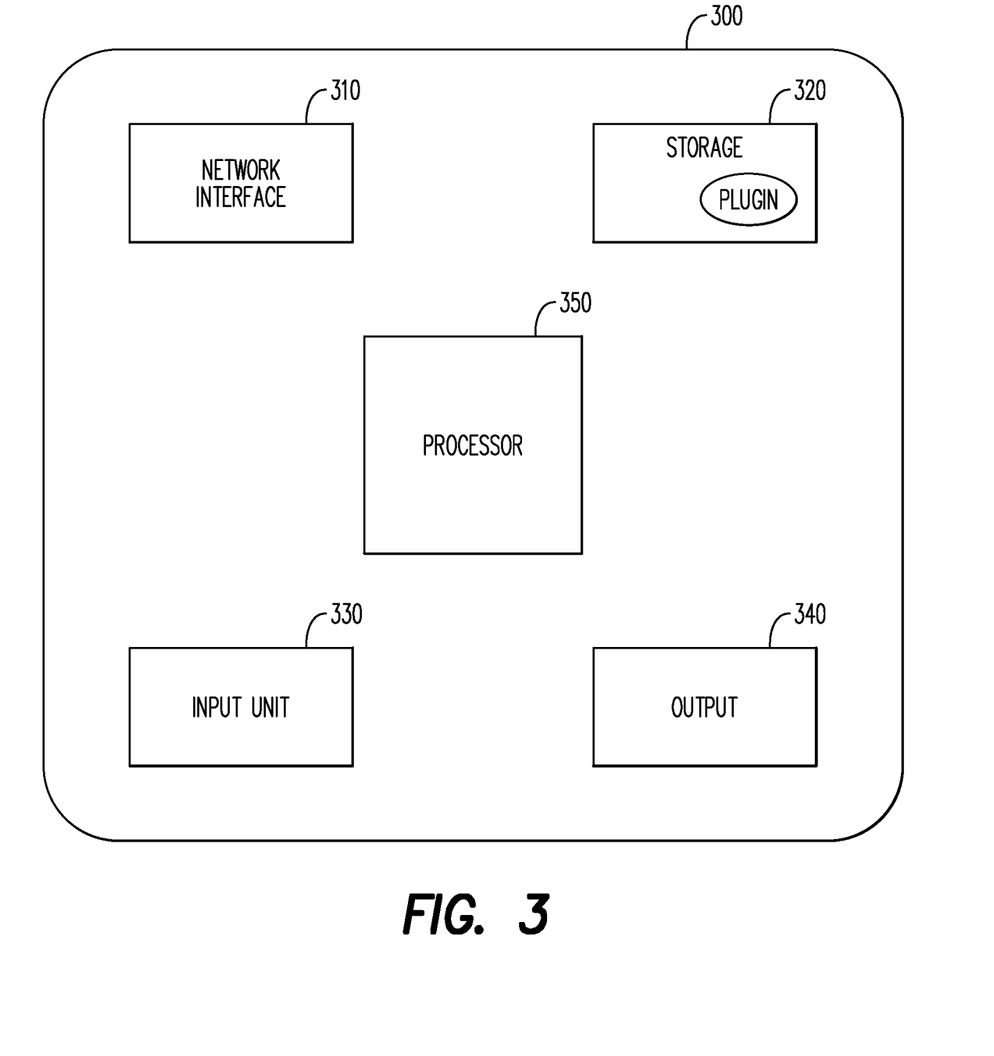
FIG. 3 is a diagram illustrating a user computing device for transmitting tokenized payment information in accordance with an exemplary embodiment.

FIG. 3 is a diagram illustrating a user computing device 300 for transmitting tokenized payment information in accordance with an exemplary embodiment. For example, the user computing device 300 may be the user computing device 110 illustrated and described with reference to FIG. 1.

Referring to FIG. 3, the user computing device 300 includes a network interface 310, a storage 320, an input unit 330, an output 340, and a processor 350. For example, the user computing device 300 may be a terminal apparatus, such as a personal computer, a laptop computer, a tablet, a phablet, a mobile phone, a smart phone, an appliance, a kiosk, a smart watch, and the like. The input unit 330 may include one or more of a keyboard, a virtual keyboard, a mouse, a track ball, a speech recognition module, a motion recognition module, a remote control, and the like. The output 340 may include a display, a plurality of displays, and the like.

In the example of FIG. 3, a plugin is stored within the storage 320. The plugin may be installed within a web browser of the user computing device and be activated by the processor 350. For example, the plugin may be activated by a user of the user computing device 300 visiting a payment submission or payment entry page of a merchant website. The plugin may detect one or more fields included in a web page downloaded from a merchant computing device that hosts the merchant website. As another example, the browser plugin may be activated by a user clicking on a button or link on the webpage of the merchant. In the example of FIG. 3, the plugin may control various components of the user computing device 300 to receive and transmit tokenized payment information.

The user computing device 300 may query the merchant website for payment details requested by the merchant website to process an online payment. For example, the processor 350 may detect various payment entry fields within a webpage of the merchant site. Here, the user computing device may be connected to the merchant website by the network interface 310. The payment fields may include one or more of a payment card number, an expiration date, a card security code number, an address, a social security number, and the like. Based on the detected payment details, the user computing device 300 may transmit a request, via the network interface 310, for payment information to a payment network. For example, the user computing device 300 may transmit the request to a wallet service provider, a token service provider, and the like. The request may identify payment fields from the merchant website which are needed to process a payment request.

The user computing device 300 may receive tokenized payment information from the payment network through the network interface 310. The tokenized payment information may include a token for a primary account number (PAN) of a user's account. Furthermore, the tokenized payment information may include one or more additional tokens for one or more additional payment account credentials. The plugin may cause the tokens to be entered (e.g., automatically filled) into payment fields of a merchant website without the merchant knowing that the entries are tokens. Instead, the entries may appear as valid entries to the merchant. The user computing device 300 may transmit tokenized payment information through the network interface 310 to the merchant computing device. For example, a user of the user computing device 300 may hit a "submit" button shown on the output 340 using the input unit 330 after tokenized payment account information has been entered into payment account fields of the merchant website. Upon successful authorization from a payment card network, the user computing device 300 may receive a notice of successful payment from the merchant computing device, or another computing device within the payment network.

Figure 4:
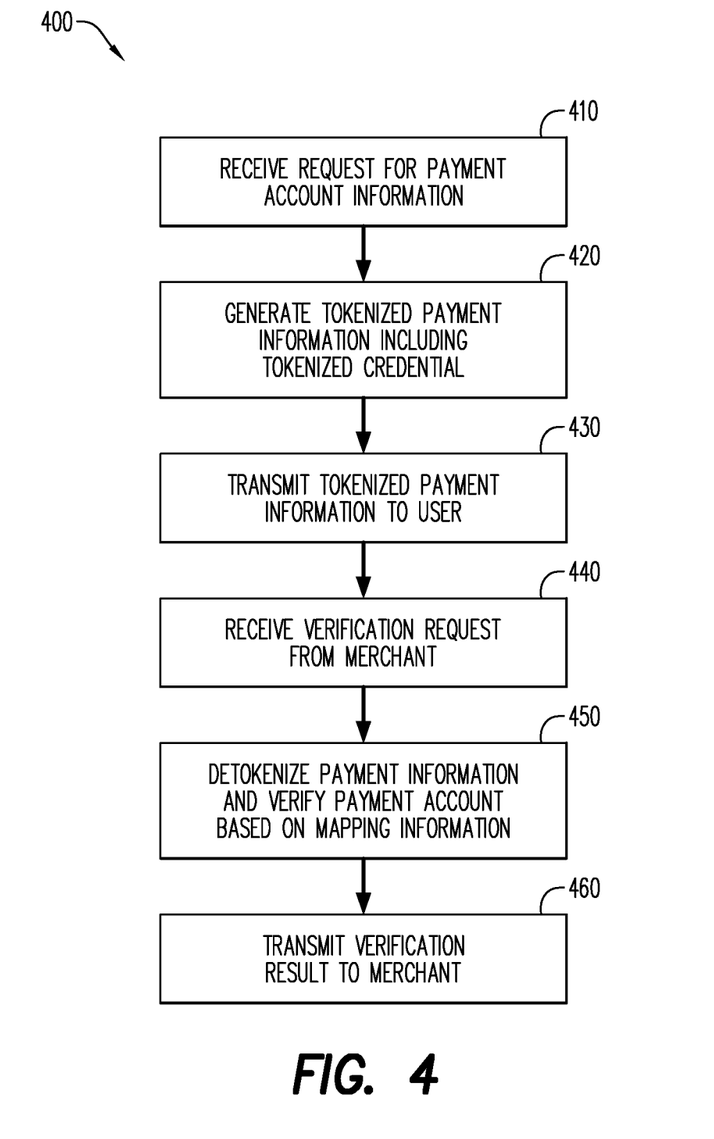
FIG. 4 is a diagram illustrating a method for generating tokenized payment information in accordance with an exemplary embodiment.

FIG. 4 is a diagram illustrating a method 400 for generating tokenized payment information in accordance with an exemplary embodiment. For example, the tokenized payment information may be generated by a token service providing device such as a token vault, and may be transmitted to a user.

Referring to FIG. 4, in 410 the token service providing device 140 receives a request for payment account information. For example, the request may be received from a cardholder device (i.e., a user computing device) and may be transmitted to the token service providing device via at least one other device such as a wallet service providing device. As an example, the request may include a request for payment account data related to a payment card included in a digital wallet provided by the wallet service providing device. In response to receiving the request, in 420, the token service providing device 140 may generate tokenized payment information of the payment account included in the digital wallet. For example, the token service providing device may generate a token for a primary account number (PAN) of a user's account (e.g., payment card). According to various aspects, the token service providing device may generate one or more additional tokens that represent one or more additional payment account credentials such as an expiration date, a card security code value, and the like. Furthermore, in 420, the token service providing device 140 may store mapping information that maps the generated tokens to the actual credentials that the tokens represent. Accordingly, the token service providing device 140 may subsequently detokenize the tokens and determine the actual credentials of the payment account based on the mapping information.

The tokenized payment information is transmitted to the user computing device, in 430. For example, the tokenized payment information may be transmitted directly to the user computing device 110, or it may be transmitted through one or more intermediate devices, such as the wallet service providing device 130. In 440, the token service providing device 140 may receive a payment request from a merchant computing device 120, including tokenized payment information. For example, the merchant may receive the tokenized payment information from the user computing device 110 when a user attempts to make a purchase from the merchant. The token service providing device 140 may detokenize the tokenized payment information based on previously stored mapping information, and verify whether the detokenized payment information corresponds to the payment account of the user, in 450. In response, the token service providing device 140 may transmit a payment authorization response to the merchant based on the verifying, in 460.

Figure 5:
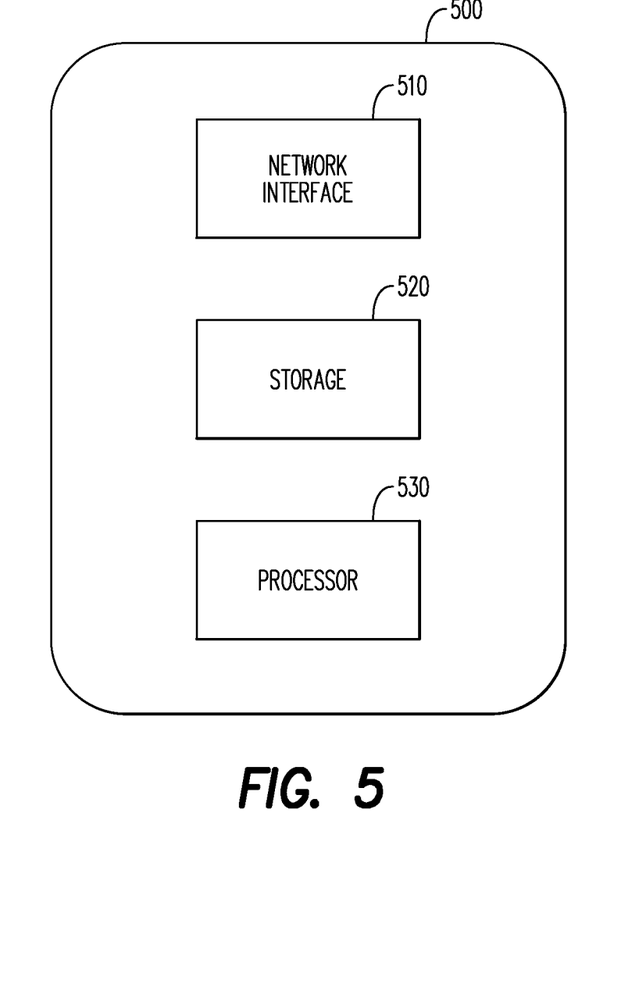
FIG. 5 is a diagram illustrating a token service providing device for generating tokenized payment information in accordance with an exemplary embodiment.

FIG. 5 is a diagram illustrating a token providing service device 500 for generating tokenized payment information in accordance with an exemplary embodiment. For example, the token providing service device 500 may be the token providing service device 140 illustrated and described with reference to FIG. 1.

Referring to FIG. 5, the token providing service device 500 includes a network interface 510, a storage 520, and a processor 530. The token service providing device 500 may receive a request for payment account information through the network interface 510. For example, the request may be received from a cardholder device and may be transmitted through a wallet service providing device to the token service providing device 500 via a network, such as the Internet. The request may include a request for payment information of a payment card included in a digital wallet provided by a wallet service provider corresponding to the wallet service providing device.

In response to receiving the request, the processor 530 may generate tokenized payment information of the payment account included in the digital wallet. For example, the processor 530 may generate a token for a primary account number (PAN) of a user's account. Furthermore, the processor 530 may generate one or more additional tokens for one or more additional payment account credentials, such as an expiration date, a card security code value, and the like. In addition, the processor 530 may store mapping information that maps the tokens to the actual credentials in the storage 520. Accordingly, the token service providing device 500 may subsequently detokenize the tokens and determine the actual credentials of the payment account based on the mapping information.

The tokenized payment information may be transmitted to a user computing device over the Internet by network interface 510. For example, the tokenized payment information may be transmitted directly to the user computing device 110, or it may be transmitted through one or more intermediate devices, such as the wallet service providing device 130. The token service providing device 500 may subsequently receive a payment request, for example, from a merchant computing device 120, a merchant bank, and the like, and the request may include the tokenized payment information. Accordingly, the processor 530 may detokenize the tokenized payment information based on previously stored mapping information stored in the storage 520, and verify whether the detokenized payment information corresponds to the payment account of the user. In response, the network interface 510 may transmit a payment authorization response based on the verifying to the merchant indicating whether the verification was successful.

According to various exemplary embodiments, described herein is a system and method that allow a cardholder to make a payment for an online transaction through a merchant website using a digital wallet, even though the merchant of the transaction is not a subscriber to a digital wallet service. Here, the merchant does not need to be aware that the cardholder is making a payment using a digital wallet because the payment is made using tokens that each have a format of existing (e.g., conventional) account credentials. Accordingly, the cardholder may pass tokens to the merchant using conventional non-tokenized payment account entry fields.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like. As another example, the terms may refer to any other device or media that may hold payment account information in addition to cards, such as mobile phones, smartphones, personal digital assistants (PDAs), key fobs, computers, and the like. Accordingly, it should be appreciated that terms such as account, card, payment account, payment card, and the like, may be used interchangeably herein, and may refer to any instrument (physical or virtual) that may be used to satisfy payment for a transaction.

While the exemplary embodiments have been described in the context of an e-commerce transaction, the teachings of this disclosure may also be applicable to, for example, in-store payment account transactions with payment-enabled mobile devices that are supported for payment purposes "in the cloud." As used herein and in the appended claims, e-commerce refers to purchases via a merchant's online store, in-aisle shopping/payment, and the like, in which payment is made over the internet or via interaction by a mobile application with a remote server or other computer.

As used herein, the term card security code may refer to any known security code used in the credit and debit account processing systems. For example, the card security code may be in the form of a three digit number or a four digit number, so as to resemble a conventional card security code such as those referred to as a "CVC" or "CVV." In that form, the card security code may fit an authorization message data field of the type used to carry such conventional three-digit security codes. Also, according to various exemplary embodiments, the card security code may be tokenized into a token that fits in a data field of a message type used to carry a conventional card security code.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory, such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Also, although the description has been described with reference to specific exemplary embodiments, it should be understood that various changes, substitutions, and alterations apparent to those skilled in the art can be made to the described exemplary embodiments without departing from the spirit and scope of the invention as set forth in the appended claims.

What is claimed is:

1. A method comprising:
   downloading and installing a plugin of a digital wallet within a web browser of a user device;
   detecting that a checkout page of a merchant website is open within the web browser and the merchant website is not enrolled in the digital wallet;
   in response to the detecting, activating the plugin installed within the web browser, and detecting, via the plugin, payment credential fields present within the checkout page open within the web browser;
   transmitting, via the plugin, a request for payment information to a server that hosts the digital wallet with identifiers of the payment credential fields detected by the plugin from the checkout page;
   enabling a payment to be performed with the digital wallet via the checkout page that is not enrolled in the digital wallet, the performing comprising:
   retrieving, via the plugin from the server that hosts the digital wallet, a tokenized primary account number (PAN) from the digital wallet corresponding to the payment credential fields detected by the plugin from the checkout page, wherein the tokenized PAN is generated from a payment account number retrieved from a payment card that is previously stored within the digital wallet, automatically populating, via the plugin, a PAN field of the checkout page with the tokenized PAN generated from the payment account number of the payment card that is previously stored within the digital wallet, and passing the tokenized PAN to a merchant server via the automatically populated PAN field of the checkout page, wherein the passing of the tokenized PAN does not notify the merchant server that the tokenized PAN is a token.

2. The method of claim 1, wherein the processor is configured to pass at least two additional tokenized credentials that include tokens having formats of at least two valid credentials, respectively.

3. The method of claim 2, wherein the additional tokenized credential comprises a tokenized expiration date, and the tokenized expiration date comprises a token having a date value that is later in time than a current date at which a transaction is taking place.

4. The method of claim 2, wherein the additional tokenized credential comprises a tokenized card security code, and the tokenized card security code has a format of a valid card security code.

5. The method of claim 2, wherein the additional tokenized credential comprises a token having a format that is recognizable to the merchant as a valid credential even though the merchant is not enrolled in a service of the wallet service provider.

6. The method of claim 1, wherein the passing comprises passing the tokenized PAN to the merchant server using a payment account entry field of the checkout page which comprise non-tokenized data entry formats.

7. The method of claim 1, wherein the checkout page is not registered to receive payment from the digital wallet.

8. The method of claim 1, wherein, in response to detecting the web browser accessing the checkout page, the plugin transmits the identifiers of the payment credential fields to the server that hosts the digital wallet.

9. A method of a token providing computing device for generating payment information, the method comprising:

detecting that a checkout page of a merchant website is open via a web browser and the merchant website is not enrolled in the digital wallet, in response to the detecting, activating a plugin installed within the web browser, and detecting, via the plugin, payment credential fields present within the checkout page open within the web browser;

receiving, via a token providing service of a digital wallet, a request for payment information with identifiers of the payment credential fields detected by the plugin from the checkout page from the plugin installed within the web browser;

retrieving a tokenized primary account number (PAN) of the user from a payment account of a payment card that is previously stored in the digital wallet;

transmitting the tokenized PAN retrieved from the payment card that is previously stored within the digital wallet to the plugin installed within the web browser with the checkout page open;

receiving the tokenized PAN from a merchant server;

detokenizing the received tokenized PAN based on previously stored mapping information of the tokenized PAN transmitted to the plugin installed within the web browser, and verifying whether the detokenized PAN corresponds to a payment account of the user; and transmitting a payment authorization response to the merchant server in response to a successful verification.

10. The method of claim 9, wherein the transmitting further comprises transmitting an additional tokenized credential that comprises a token having a format of a valid credential.

11. The method of claim 10, wherein the additional tokenized credential comprises at least two additional tokenized credentials that include tokens having formats of at least two valid credentials, respectively.

12. The method of claim 10, wherein the additional tokenized credential comprises a tokenized expiration date, and the tokenized expiration date comprises a token having a date value that is later in time than a current date at which a transaction is taking place.

13. The method of claim 10, wherein the additional tokenized credential comprises a tokenized card security code, and the tokenized card security code has a format of a valid card security code.

14. The method of claim 9, wherein the tokenized PAN comprises a token having a format that is recognizable to the merchant as a valid credential even though the merchant is not enrolled in the digital wallet.

15. A user computing device for transmitting tokenized payment information, the user computing device comprising:

a processor configured to download and install a plugin of a digital wallet within a web browser of the user computing device, and detect that a checkout page of a merchant website is open within the web browser and the merchant website is not enrolled in the digital wallet, wherein, the processor is further configured to in response to detecting the access of the checkout page, activating the plugin installed within the web browser, and detecting, via the plugin, payment credential fields present within the checkout page open within the web browser, transmit, via the plugin, a request for payment information to a server that hosts the digital wallet with identifiers of the payment credential fields detected by the plugin from the checkout page;

retrieve, via the plugin from the server that hosts the digital wallet, a tokenized primary account number (PAN) from the digital wallet corresponding to the payment credential fields detected by the plugin from the checkout page, wherein the tokenized PAN is generated from a payment account number retrieved from a payment card that is previously registered within the digital wallet, and automatically populate, via the plugin, a PAN field of the checkout page with the tokenized PAN generated from the payment account number of the payment card that is previously registered within the digital wallet; and a network interface configured to pass the tokenized PAN to a merchant server via the automatically populated PAN field of the checkout page, wherein the passing of the tokenized PAN does not notify the merchant server that the tokenized PAN is a token.

16. The user computing device of claim 15, wherein the processor is further configured to pass an additional tokenized credential that comprises a tokenized expiration date, and the tokenized expiration date comprises a token having a date value that is later in time than a current date at which a transaction is taking place.

17. The user computing device of claim 15, wherein the processor is further configured to pass an additional tokenized credential that comprises a tokenized card security code, and the tokenized card security code has a format of a valid card security code.

18. The user computing device of claim 15, wherein the tokenized PAN comprises a format that is recognizable to the merchant as a valid credential even though the merchant is not enrolled in the digital wallet.

\* \* \* \* \*